(No Model.) 4 Sheets—Sheet 1.
A. HERR.
MACHINE FOR SEPARATING GARLIC FROM WHEAT.
No. 408,619. Patented Aug. 6, 1889.
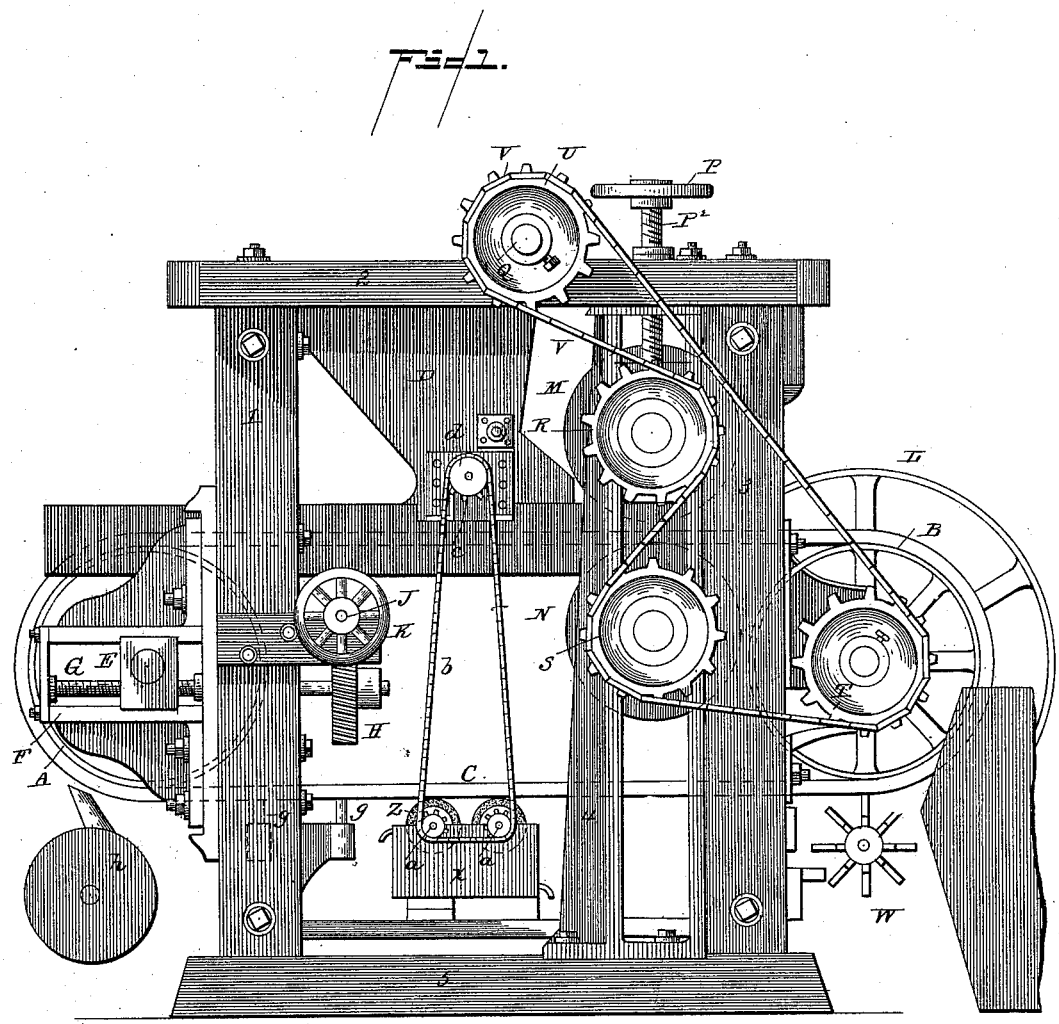
WITNESSES
Edwin D. Yewell.
E. Everett Ellis
Austin Herr
INVENTOR
By
Attorney (No Model.) 4 Sheets—Sheet 2.
A. HERR.
MACHINE FOR SEPARATING GARLIC FROM WHEAT.
No. 408,619. Patented Aug. 6, 1889.
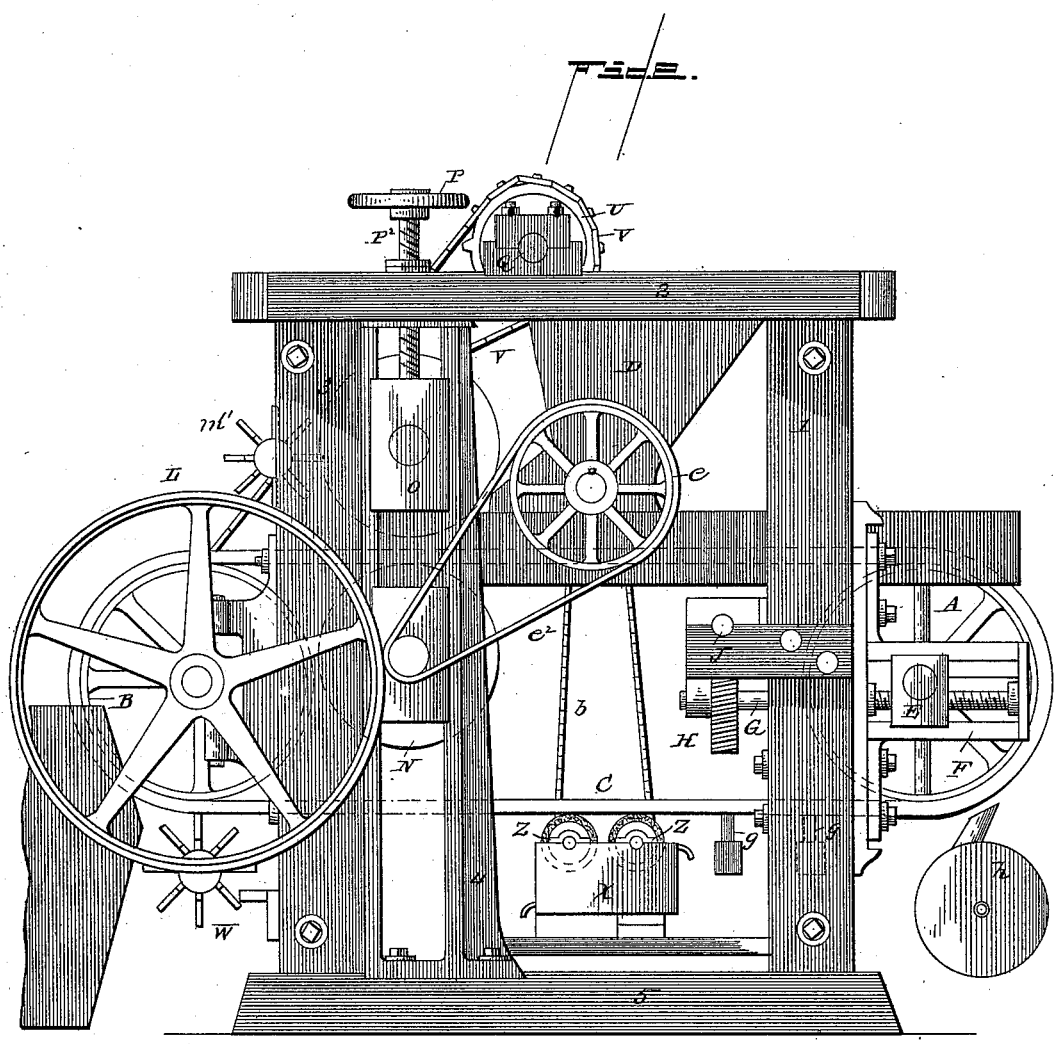
WITNESSES
Edwin L. Yewell.
E. Everett Ellis
Austin Herr
INVENTOR
By
Attorney (No Model.) 4 Sheets—Sheet 3.
A. HERR.
MACHINE FOR SEPARATING GARLIC FROM WHEAT.
No. 408,619. Patented Aug. 6, 1889.
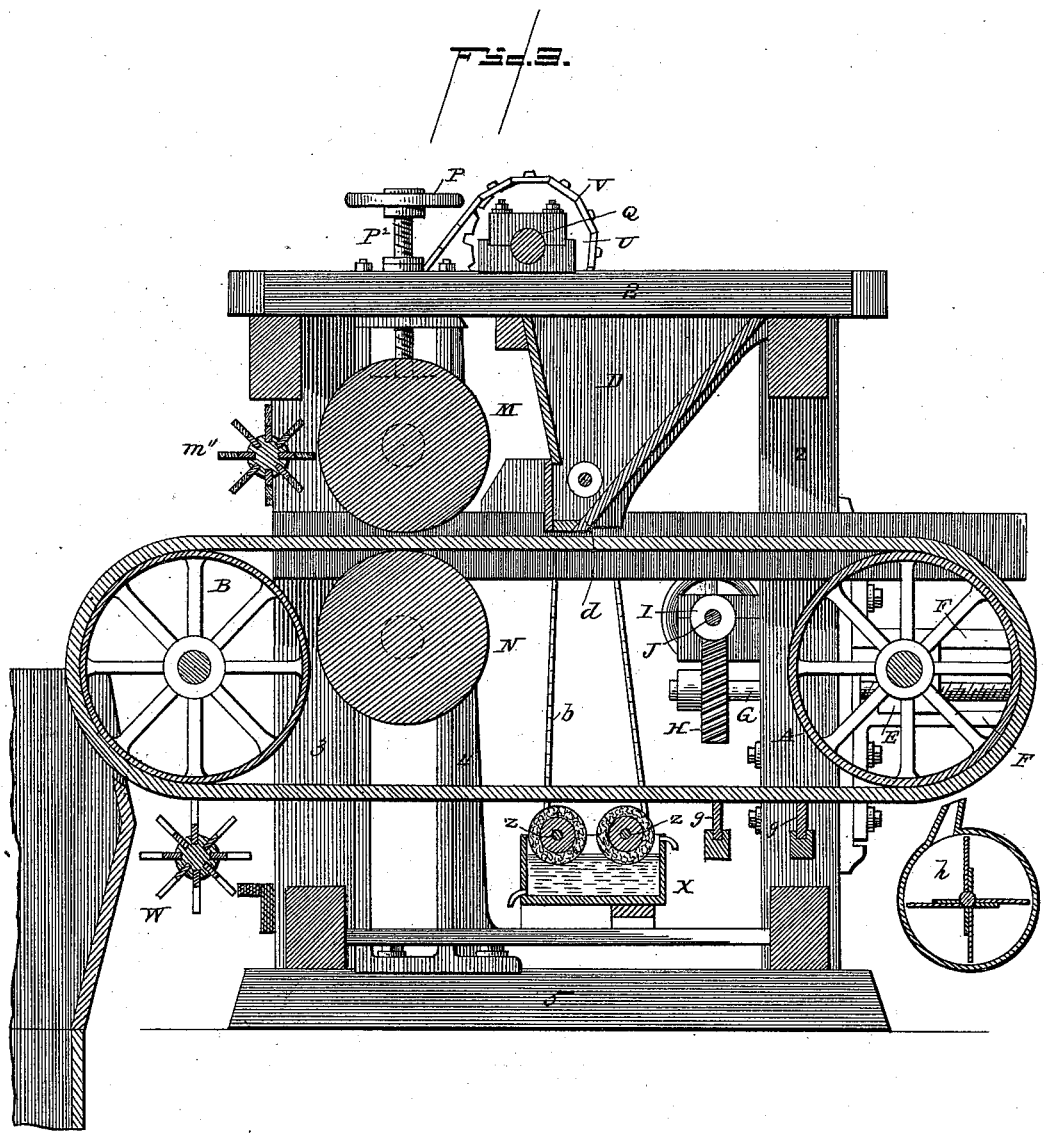
WITNESSES
Edwin L. Yewell
E. Everett Ellis
Austin Herr
INVENTOR
By
Wm. C. W. McIntire
Attorney

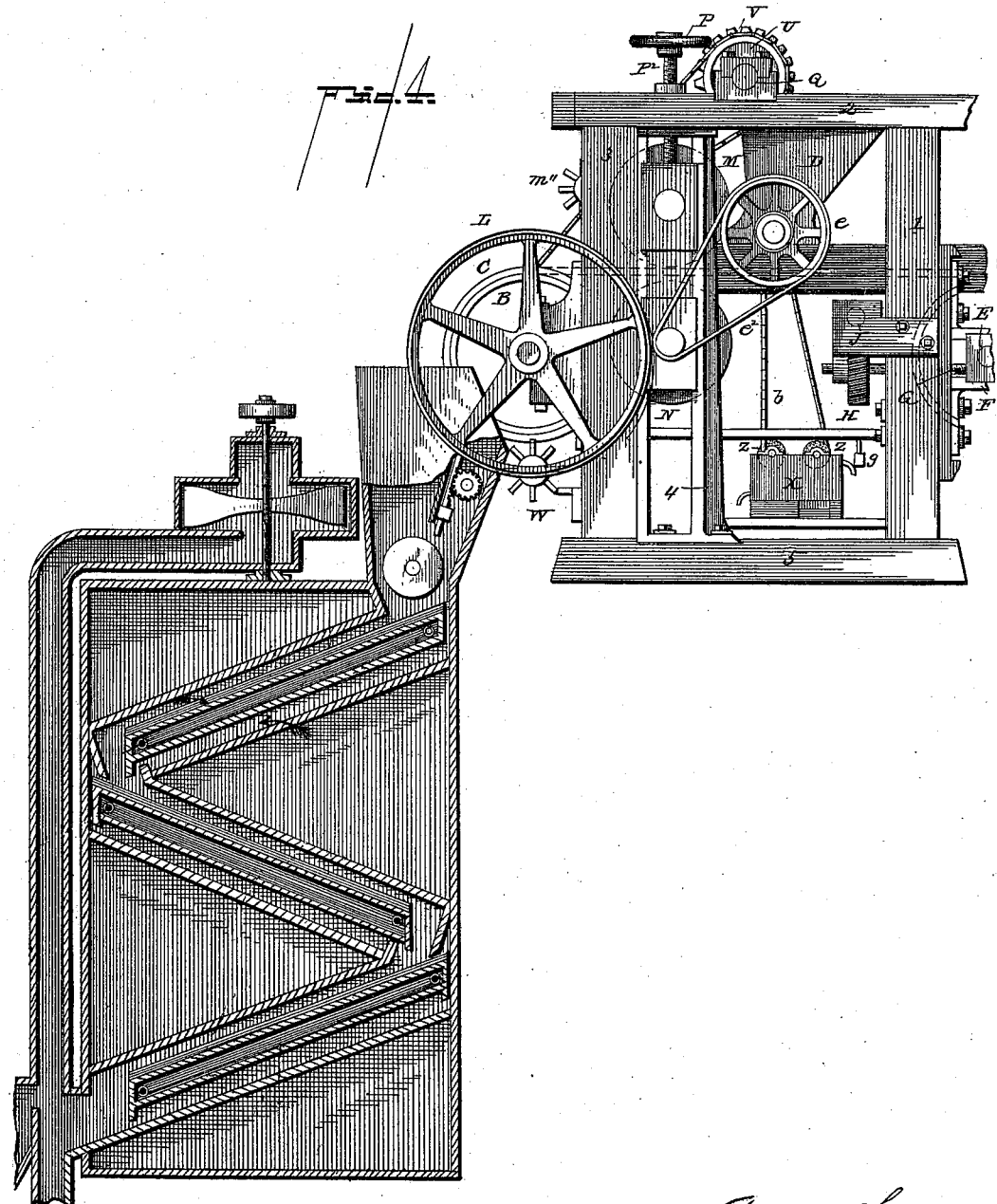

UNITED STATES PATENT OFFICE.

AUSTIN HERR, OF WASHINGTON, DISTRICT OF COLUMBIA.

MACHINE FOR SEPARATING GARLIC FROM WHEAT.

SPECIFICATION forming part of Letters Patent No. 408,619, dated August 6, 1889.

Application filed March 29, 1888. Serial No. 268,844. (No model.)

*To all whom it may concern:*

Be it known that I, AUSTIN HERR, a citizen of the United States, residing at Washington, in the District of Columbia, have invented new and useful Improvements in Machines for Separating Garlic from Wheat, of which the following is a specification.

This invention relates to certain new and useful improvements in apparatus or machines for separating garlic from wheat; and it consists, substantially, in such features thereof as will hereinafter be more particularly described, and pointed out in the claims.

In a former application filed by me on the 29th day of December, 1886, and bearing Serial No. 222,911, I have set forth and claimed certain improvements in methods or processes for separating garlic from wheat, and wherein, in order to show in what manner such method or process is effected, I have described and illustrated substantially the same apparatus or machine as forms the subject-matter of the present invention; and since in the application referred to I have elected to claim my process or method irrespective of any particular apparatus for carrying the same into effect it will be understood that in the present case I intend to claim only the particular apparatus or machine devised by me for that purpose.

In addition to having devised the particular separating-machine of the present case, I have also invented a specific form of drying or evaporating apparatus, and for the purpose of claiming the same I have filed, of even date herewith, a separate application for Letters Patent, bearing Serial No. 268,843.

A number of machines have been invented heretofore having similar objects in view as the present; but, so far as I am aware, none have proved effectual in completely removing the garlic without leaving some discoverable traces thereof.

It is well known that, as received into the mill, winter wheat is always found to contain a greater or less percentage of this objectionable substance "garlic," which from its characteristic composition and acrid taste will always yield, upon grinding, a most offensively-smelling oil that injures the valuable properties of the wheat, besides coating the burrs or rolls with a glazed surface, which not only destroys their efficiency as granulators of wheat, but also reduces their capacity.

The object of the present invention is to provide a machine or apparatus by which the garlic is separated from wheat so effectually that not even the slightest odor or taste thereof remains in the wheat, thereby accomplishing in this class of machines a result never heretofore attained.

The invention also has other objects in view, all as will more fully hereinafter appear when taken in connection with the accompanying drawings, wherein—

Figure 1 represents a vertical longitudinal elevation of one side of a garlic-separating machine constituting my invention, and Fig. 2 is a similar view taken from the opposite side thereof. Fig. 3 is a vertical longitudinal sectional view of Fig. 2. Fig. 4 represents a side elevation of a portion of the separating-machine as shown by Fig. 2, together with a vertical sectional elevation of one form of drying apparatus employed by me.

In the practice of my invention the wheat is delivered through a suitable feed-hopper upon the surface of a traveling belt that is made to pass between two revolving rolls for the purpose of mashing the bulbs or cuticle of garlic without at all crushing or injuring the grain. This belt is formed of some elastic and resilient material—such as partially-vulcanized india-rubber—so that in the passage of the belt between the rolls the grains of wheat will be pressed or embedded into the material of the belt, while the bulbs or cuticle of garlic will be mashed or crushed on the surface thereof, and then immediately after the impressed portion of the belt is free of the rolls the embedded grain will be loosened or freed by the elastic or resilient nature of the material of the belt and permitted to precipitate itself into a receiving-hopper provided for it. For the purpose of maintaining the belt sufficiently taut and to enable the same to be so regulated as that its fibers will be either contracted or expanded to the required degree for accomplishing the end desired, I have provided certain adjusting mechanism therefor, and also I have provided adjusting devices for one of the rolls through which this belt passes, by which greater or diminished pressure upon the belt may be had. Further, I resort to certain scraping and cleaning devices, by which the belt is freed of the adherence of both the pulp and juices of the garlic, gaining thereby the maximum extent of cleansed surface, by which the said belt is always in a condition to receive continuously a supply of material.

Reference being had to the several parts by the letters marked thereon, 1, 2, 3, and 4 represent different parts of the frame-work of the machine, and 5 designates the base. Located at opposite ends of the machine are two cylinders A B, around which travels an endless elastic belt C, made, preferably, of partially-vulcanized india-rubber, although it is evident that the same may be of any other material possessing the requisite characteristics for the purpose intended. It is this belt which receives the incoming material from the feed-hopper D. The shaft of cylinder B has fixed or stationary bearings secured to the end portions of the frame, while the journals of the shaft of cylinder A are supported in movable box-bearings E, by which the said cylinder is adjusted to either contract or expand the fibers of the belt C, in order that it may be brought to the proper degree of elasticity or resiliency to both receive the grain into its body and again discharge or loosen it therefrom.

The boxes E are supported by and are adjustable longitudinally in guides F, bolted to the end pieces of the frame, as shown, and extending horizontally through each box is a screw rod or bolt G, carrying at its inner end a worm-wheel H, which gears with a worm I, formed or provided on adjacent portions of a shaft J, borne in the frame at right angles to the screw-rods, the said shaft having also at one end a hand-wheel K, through the medium of which it is turned to impart motion through the worms and wheels to the screws G, and thereby cause the boxes E to move in or out, according to the direction of rotation of the shaft. The shaft of the cylinder B is provided at one end with the drive-wheel L, which is suitably connected with the propelling or motive power for driving the machine.

Supported in suitable bearings between the parts 3 and 4 of the frame-work, one above the other and nearest to the cylinder B, are two metallic rolls M N, the bearings for the lower one (N) being fixed or stationary, while those O of the upper one (M) are movable vertically, and are adjusted by means of screw-rods $P^2$, extending into the same and through the upper horizontal portion 2 of the frame, the said screw-rods being provided with hand-wheels P, by which they are turned to either raise or lower the bearings and roll.

The object in having the upper roll movably supported is to permit of the adjustability thereof to cause a greater or less pressure upon the belt C during its travel with material between the two rolls, thus enabling the proper action to be had to insure the desired effect.

To the corresponding ends of the shafts of the rolls M and N, the shaft of the cylinder B, and idle-shaft Q, supported in bearings on top of the machine, are respectively keyed or secured the sprocket-wheels R, S, T, and U, around which trends, in the manner shown, the sprocket-chain V, the arrangement being such as that no differential speed is had, thus obviating or reducing friction to a minimum, which would otherwise soon injure or wear out the endless belt C passing between the rolls.

Supported in any suitable manner beneath the belt contiguous to the cylinder B is a revolving scraper W, which may be operated in any suitable manner, and which is designed to scrape off the cuticle or mashed bulbs of garlic that adhere to the belt after the combined mass of material has been subjected to the action or pressure of the rolls. This scraper is preferably constructed of a number of wings having blades of rubber sufficient to have one always in contact with the belt; and it is evident that the same is intended to be revolved in a direction opposite to that traveled by the belt. As the material is carried between the rolls the grains of wheat are pressed or embedded into the body of the belt C, while the bulbs of garlic, being of a softer nature, are mashed onto the surface thereof; and as the belt emerges from or passes through the rolls the resilient quality of the material of which it is constituted will loosen the grain, while the cuticle and pulp of the garlic bulb, being more or less saturated or impregnated with their expressed juices, will adhere to the surface of the belt until removed by the scraper W. A scraper of exactly the same construction as the foregoing and marked $m''$, Fig. 3, is utilized to clean the rolls M of adhering pieces of pulp or cuticle and juice expressed from the garlic in its passage between the rolls. This pulp or cuticle drops from the scraper $m''$ to the belt C, and is conveyed with the wheat to the hopper K, whence it passes into the evaporator.

Also located beneath the belt about centrally of the cylinders A and B is a tank X, having inlet and outlet for the water. This tank supports between opposite sides and transversely to the belt two rolls Z Z, having each at corresponding ends a sprocket-wheel $a$, and the surfaces of which are covered or provided with a material, as sponge, for sweeping the surface of the belt to wash and relieve it as much as possible of the juice expressed from the garlic in the passage of the wheat between the rolls. The said tank should be continuously supplied with fresh water, so as to insure perfect cleansing and to keep the sponges free of contamination by the garlic-juice. The rolls Z Z are continuously revolved or rotated by a sprocket belt or chain $b$ engaging the sprockets $a$, as shown, the said belt also passing over another sprocket-wheel c, carried on the corresponding end of the hopper feed-regulating roll d, which carries at its other end a wheel or pulley e, connected by a belt $e^2$ to the shaft of the lower roll N. The motion of this roll is communicated to the tank-rolls through the sprocket chain or belt b, as is evident.

Following after the tank beneath the belt C, and located intermediate of the said tank and cylinder A, is a set or series of squeegees or scrubbers g, which clear the belt of moisture or wet received from the washing-rolls. These devices may be constructed of any material of a sufficient rigidity for the purpose, and are located and secured in position in any suitable manner. Succeeding these squeegees or scrubbers g, beneath the belt contiguous to the cylinder A, is a fan or blower h, which may be supported and held in any suitable manner. The spout or nozzle of this blower is arranged at a tangent or angle to the cylinder, and thus it will be seen that a forced current of air will be projected across the surface of the belt in such manner as to carry with it any adhering material, and also to dry the belt by evaporating the moisture that may be contained thereon.

In my experiments with this class of machines I have attempted the use simply of two rolls, of which one was covered with an elastic resilient material, as partially-vulcanized india-rubber, and through both of which rolls the mass of material was fed for the purpose of separating the garlic by mashing in a manner similar to that resorted to in the present instance; but in the use of two rolls I find that it is very difficult to keep the surface of the covered roll in such clean and dry condition as is requisite to a perfect result. By the use of my present invention it will be seen that so great a portion of the superficial area of the belt is being operated upon by the cleaners as to be constantly presenting a clean dry surface between the rolls.

As before stated, as soon as the material issues from between the rolls the resilient nature of the material of the belt on which it is carried will loosen the grain therefrom, and as the belt moves forward this loosened material will be precipitated by gravity into the receiving-hopper k of an evaporator, which should be as near the crusher as possible.

Among other former inventions for the separation of garlic from wheat, it has been customary to subject the combined mass to a scraping process under the action of heat; but in such instances referred to the grains of wheat are so completely saturated or impregnated by the juices of the garlic as to render it absolutely impossible to prevent the penetration of such juices into the interior of the grain, and to eradicate which requires a degree of heat so great as to entirely destroy the qualities of the wheat. In the use of my invention the material is passed directly from the separator into the evaporating apparatus for the purpose of evaporating therefrom any of the expressed juices of the garlic that may possibly be received on the outer surface in the crushing or mashing apparatus, thereby removing every possible adherence before a chance is had to penetrate, and which I find does not require a degree of heat greater than about 140° Fahrenheit.

From the foregoing description it is thought that the operation of my invention will be thoroughly understood, and I desire to state that while I have herein shown and described certain constructions and arrangements of parts, I do not wish to be understood as limiting myself thereto in precise detail, as very material changes could be resorted to and still be within the scope of my invention. For instance, I do not confine myself to the particular mechanism herein described, by which the rolls A and B and the belt C are operated. Neither do I confine myself to the particular arrangement of and means for operating the washing and cleaning devices beneath the belt, nor to the particular constructions thereof shown, for it is evident that all of these may be modified or changed in various ways.

Having thus described my invention, what I claim as new, and desire to secure by Letters Patent, is—

1. In a garlic-separating machine, the combination of a traveling band of partially-vulcanized india-rubber, two or more hard-faced rolls operating upon the surfaces of said band, and means for operating the band and rolls, substantially as described.

2. In a garlic-separating machine, the combination of the upper roll, having movable bearings and means for adjusting the same, the lower roll having stationary bearings, the intermediate traveling elastic resilient band, and means for operating the whole, substantially as described.

3. In a garlic-separating machine, the combination of the two rolls, a revolving cylinder at each end of the machine beyond the rolls, means for adjusting one of said cylinders longitudinally of the belt, a resilient elastic band passing around the cylinders and between the rolls, and means for operating the parts, substantially as described.

4. In a garlic-separating machine, the combination of two rolls supported in bearings one above the other, means for adjusting the said rolls with relation to each other, two cylinders supported in bearings at opposite ends of the machine, means for adjusting said cylinders with relation to each other, an elastic band passing around the cylinders and between the rolls, and means for operating the parts, substantially as described.

5. In a garlic-separating machine, the combination, with the traveling resilient elastic band, of the tank and washing-rolls located beneath the same, and means for revolving the said rolls against the surface of the band, substantially as described.

6. In a garlic-separating machine, the combination of the hopper feed-roll bearing at one end a sprocket-wheel, the tank X, and the sponge-rolls Z Z, each bearing also a sprocket-wheel, and the sprocket chain or belt passing around these wheels, substantially as shown, and for the purpose described.

7. In a garlic-separating machine, the combination, with the traveling resilient elastic band or belt, of the scraper W, and the tank and washing-rolls, and means for operating said rolls, substantially as described.

8. In a garlic-separating machine, the combination, with the traveling resilient elastic belt, of the tank and washing-rolls, the squeegees g, and the blower following thereafter, substantially as shown, and for the purpose described.

9. In a garlic-separating machine, the combination of the two rolls, each bearing a sprocket-wheel at one end of its shaft, the two cylinders arranged at opposite ends of the machine, the shaft of one having a corresponding wheel, the idler U and sprocket-chain, and the resilient elastic band passing around the cylinders and between the rolls, the whole adapted to operate substantially as described.

10. In a garlic-separating machine, the combination, with the frame having slotted extensions F, of the cylinder A, supported in bearings movable in said slotted extensions, the screws G, carrying worm-wheels H, the shaft J, having hand-wheel and provided with worms engaging said wheels H, the opposite cylinder B, having fixed bearings, and the resilient elastic belt passing and traveling around the two cylinders, substantially as shown and described.

11. In a garlic-separating machine, the combination, with the rolls M N, of the hopper feed-roll d, bearing at one end a sprocket-wheel and at the other the pulley e, the tank, and the sponge-rolls having sprocket-wheels corresponding to d, the sprocket-belt b, and the belt $e^2$, connecting the pulley e with the shaft of roll N, substantially as shown, and for the purpose described.

12. In a garlic-separating machine, the combination, with the elastic traveling band, of a scraper, washer, and drier for said band, the same being successively arranged beneath the band and operated by suitable means, substantially as described.

13. In a garlic-separating machine, the combination, with the rolls, the cylinders, and the traveling elastic band passing around the cylinders and having its surfaces operated upon by the rolls, of a hopper for feeding the material to the band at the bite of the rolls, substantially as described.

14. In a garlic-separating machine, the combination, with two or more hard-faced rolls, an intermediate traveling elastic band, and means for operating said band and rolls, of a suitable drying or evaporating apparatus for the grain or material, substantially as described.

In testimony whereof I have hereunto set my hand in the presence of two subscribing witnesses.

AUSTIN HERR.

Witnesses:
JNO. IRWIN, Jr.,
J. W. HULSE.